Jan. 14, 1941.  E. R. SANDOS ET AL  2,228,849
SEAL FOR VALVE MECHANISMS
Filed May 17, 1938
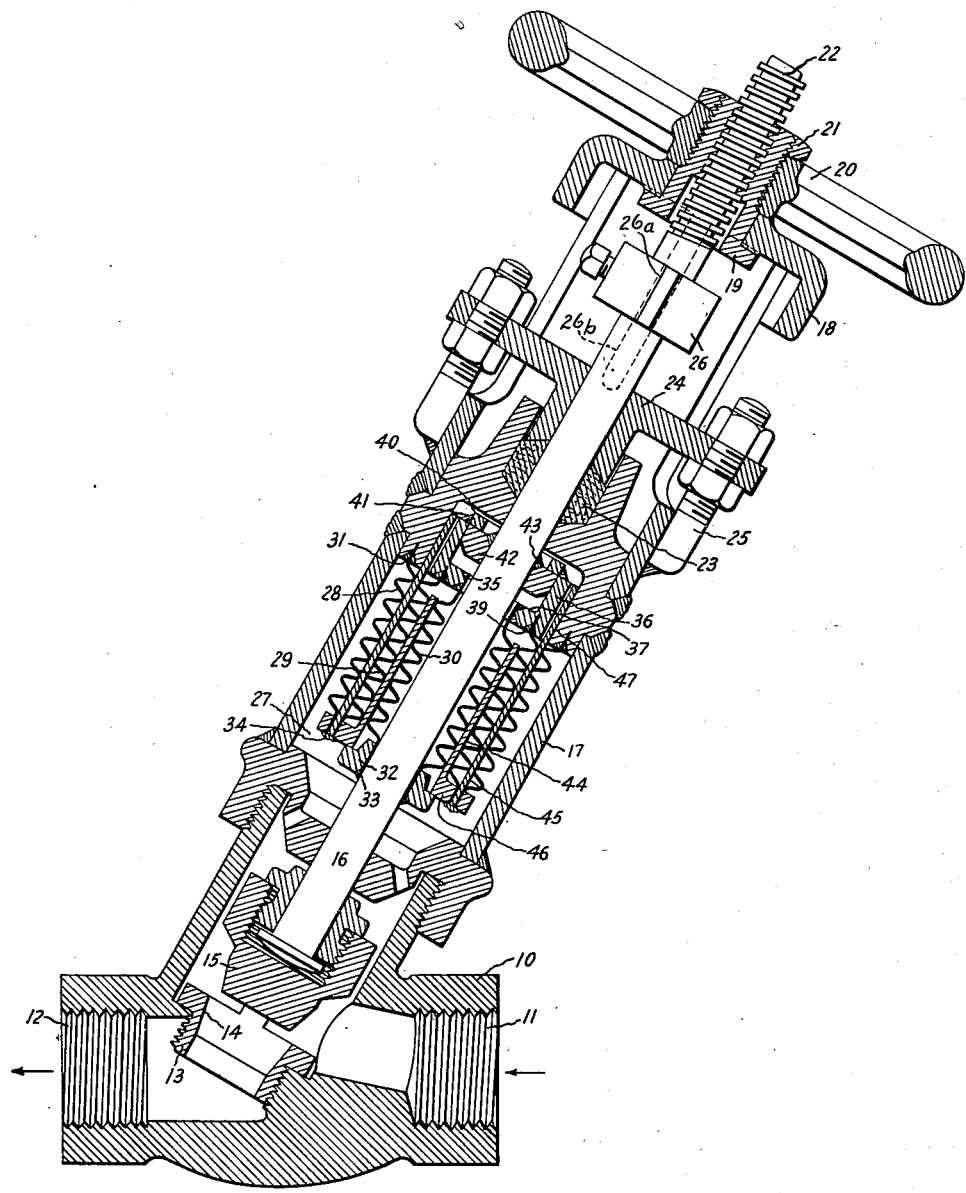
Inventors:
Elis R. Sandos,
Sidney O. Huntington,
by Harry E. Dunham
Their Attorney.

Patented Jan. 14, 1941

2,228,849

UNITED STATES PATENT OFFICE 2,228,849

SEAL FOR VALVE MECHANISMS

Elis R. Sandos and Sidney O. Huntington, Scotia, N. Y., assignors to General Electric Company, a corporation of New York Application May 17, 1938, Serial No. 208,388

8 Claims. (Cl. 286—29)

The present invention relates to valve mechanisms comprising a valve casing, a movable valve member with a stem projecting through the casing and means sealing the casing to the movable valve member. More particularly, the invention relates to the kind of valve mechanisms in which the sealing means between the movable and stationary valve member is in the form of a bellows at one end sealed to the casing and at the other end sealed to the movable valve member such as the stem projecting through the casing. Sealing means of this kind eliminate completely the leakage of fluid from the valve mechanism. Their provision is essential in arrangements in which the flow of fluid, such as mercury, injurious to life has to be controlled. While a sealing means in the form of bellows permits complete elimination of leakage, it has in some cases the disadvantage of substantially increasing the dimensions of the valve mechanism, the increase in dimension depending upon the required length of valve travel.

The object of our invention is to provide an improved construction and arrangement of valve mechanisms of the type above specified in which leakage is eliminated by means of bellows sealing the valve stem or other movable valve member to the valve casing whereby the dimensions of the mechanism are kept at a minimum. This is accomplished in accordance with our invention by the provision of a plurality of concentric, series-connected bellows surrounding the valve stem and sealed to the stem and the casing. In a preferred embodiment of our invention, means are provided to limit expansion of the bellows and also to limit relative movement between them as well as to protect the bellows against forces caused by high pressure fluid in the valve casing.

For a better understanding of what we believe to be novel and our invention, attention is directed to the following description and the claims appended thereto in connection with the accompanying drawing.

The single figure of the drawing illustrates a sectional view of a valve mechanism embodying our invention The valve mechanism comprises a valve body or casing 10 forming an inlet 11 and an outlet 12 for connection to conduits. A flanged ring 13 is secured to the casing intermediate the inlet and outlet to form a conical valve seat 14 in cooperative relation with a conically-shaped valve member 15 loosely held on the lower end of a stem 16. The valve casing 10 has a cylindrical extension 17 surrounding the stem and engaging at its upper end an end plate 18. A flanged sleeve 19 projects through an opening in the end plate and has inner and outer screw-threaded portions. A handwheel 20 is threaded on the outer portion of the sleeve 19 and locked thereto by a nut 21. The upper or outer end of the stem 16 has a threaded portion 22 engaging the inner threaded portion of the sleeve 19 so that rotation of the handwheel 20 in one direction causes closing travel of the stem 16, and rotation of the handwheel 20 in the opposite direction causes opening travel of the stem 16. An upper portion of the stem 16 is sealed to the casing by means including a packing ring 23 seated in a groove or recess of the casing surrounding the stem and held in position by a flanged sleeve 24 surrounding the stem and fastened to the casing by means of a plurality of bolts 25 with lower ends welded to the outer surface of the casing. Opening movement of the stem 16 may be limited by a stop 26 adjustably secured to the stem and engaging in its upper end position the flange 19. The stop 26 serves also as a guide to prevent rotation of the valve stem 16. To this end, the member 26 has diametrically opposite projections 26a projecting into slots 26b in the outer casing.

The arrangement so far described is known in the art and typical of valve mechanisms in which a movable valve member having a stem projecting through the casing is sealed to the casing by an ordinary packing ring seated in a groove formed by the casing or an extension thereof and engaging the stem. In order to eliminate completely leakage of fluid along the valve stem 16 we provide a plurality of concentric, series-connected bellows sealing the stem to the casing. In the present example the extension 17 of the casing forms a chamber 27 intermediate the valve member 15 and the packing 23. Three concentric bellows, an outer bellows 28, an intermediate bellows 29 and an inner bellows 30 surrounding the stem are disposed in the chamber 27. The outer bellows 28 is sealed at its upper end to the casing by a weld 31. The inner bellows is sealed at its lower end to the stem 16 by means including a ring 32 and a weld 33. The intermediate bellows is connected in series between the outer and inner bellows, the lower end of the intermediate bellows being connected to the lower end of the outer bellows by means including a weld 34 and the upper end of the intermediate bellows being sealed to the upper end of the inner bellows by means including a weld 35.

The arrangement further includes means to limit the expansion of the inner bellows and the relative movement between the inner and the outer bellows. This last mentioned means forms a part of the aforementioned means for connecting the bellows. More specifically, the sealing arrangement includes a short cylinder 36 disposed in the upper portion of the chamber 27 and having a lower end with a flange 37. The upper ends of the intermediate and the inner bellows are secured to said flange 37 by welds 38 and 39 respectively. The upper end of the short cylinder 36 has a flange 40 formed by a ring secured to the short cylinder by a weld 41. A ring 42 is disposed inside the short cylinder 36 intermediate its lower and upper flanges 37 and 40 respectively and this ring 42 is secured to the stem by a weld 43.

A cylindrical sleeve 44 is disposed between the inner and the intermediate bellows and another cylindrical sleeve 45 is disposed between the intermediate and the outer bellows. The lower end of the sleeve 44 has a flange 46 which is connected to the lower end of the sleeve 45 by the aforementioned weld 34. The upper end of the sleeve 44 in the position shown is spaced from the flange 37 of the short cylinder 36. The upper end of the sleeve 45 engages slidably a cylindrical surface 47 formed by the casing.

The operation of the sealing mechanism is as follows: In the position shown, downward movement of the stem 16 at first causes expansion of the inner bellows 30, the upper end of the latter remaining stationary and the lower being moved downward with the stem. Expansion of the bellows 30 continues until the stop ring 42 during downward travel engages the flange 37 of the short cylinder. If now the stem is moved further downward, the short cylinder is forced downward by the stop ring 42. During this movement the inner bellows is no longer expanded. The intermediate bellows during this further downward movement is compressed and this compression continues until the flange 37 of the short cylinder 36 engages the upper end of the sleeve 44. The outer bellows during the further downward movement is expanded and this expansion of the outer bellows continues until the movable valve member engages the valve seat. During opening movement of the closed valve the outer bellows is first compressed or, from another viewpoint, it is relieved from the tension due to the expansion it has undergone previously. At the same time the intermediate bellows is expanded or, from another viewpoint, it is relieved from the stress due to the compression it has undergone during the previous movement and finally, the inner bellows during the further opening movement is compressed until the valve is fully open. The opening position may be indicated by engagement between the flange 40 of the short cylinder with the valve casing or by properly setting the stop 26.

Briefly, during closing of the valve the inner and outer bellows are expanded in succession while the intermediate bellows is compressed during the expansion of the outer bellows, and during opening movement the inner and outer bellows are compressed in succession while the intermediate bellows is expanded during the compression of the outer bellows. The total movement, that is, the compression or expansion of both the inner and outer bellows, is equal to the total valve travel. To accomplish the same effect with a single bellows instead of three concentric bellows it would be necessary to provide a single bellows of at least twice the length of one of the three bellows. Thus by the provision of concentric, series connected bellows the dimension of the casing is materially reduced.

The sleeves 44, 45 together with the elements associated therewith limit expansion of the bellows and relative movement between them. At the same time these sleeves form guides for the bellows, preventing one bellows from interfering with the movement of the other. In case the valve is used in connection with high pressure fluids, the sleeves 44, 45 have another important function in that they prevent the bellows from collapsing due to forces exerted upon them by the high pressure fluid in the valve casing.

Having described the method of operation of our invention, together with the apparatus which we now consider to represent the best embodiment thereof, we desire to have it understood that the apparatus shown is only illustrative and that the invention may be carried out by other means.

What we claim as new and desire to secure by Letters Patent of the United States, is:

1. A sealing arrangement comprising a casing, a movable element projecting through the casing, and a plurality of concentric series-connected bellows sealing the element to the casing with the outer bellows enclosing all other bellows and with one end of each bellows directly secured to the adjacent end of another bellows and the other ends of adjacent bellows secured to the casing and the element respectively.

2. A sealing arrangement comprising a casing having an opening, a movable stem projecting through the opening, and means sealing the casing to the stem comprising a plurality of concentric bellows connected in series between the stem and the casing, one end of each bellows being directly secured to the adjacent end of an adjacent bellows and means including sleeves concentrically located between adjacent bellows with one end free and the other end secured to an end of one of the bellows to limit movement thereof.

3. A sealing arrangement comprising a casing having an opening, a movable stem projecting through the opening, and means sealing the casing to the stem comprising an outer, an intermediate and an inner bellows with the outer bellows surrounding all other bellows and the stem, the inner bellows having an end sealed to the stem, the outer bellows having an end sealed to the casing and the intermediate bellows having an upper end secured to the upper end of the inner bellows and a lower end secured to the lower end of the outer bellows.

4. A sealing arrangement comprising a casing member having an opening, a stem member projecting through the opening, means sealing the members to each other comprising an outer, an intermediate and an inner bellows concentrically arranged with the outer bellows surrounding the other bellows and sealed to one of said members, the inner bellows sealed to the other member and the intermediate bellows having an upper end sealed to the upper end of the inner bellows and a lower end sealed to the lower end of the outer bellows, and means limiting relative movement between the bellows.

5. A sealing arrangement comprising a casing member having an opening, a stem member projecting through the opening, means sealing the members to each other comprising an outer, an intermediate and an inner bellows concentrically arranged with the outer bellows sealed to one of said members, the inner bellows sealed to the other member and the intermediate bellows having an upper end connected to the upper end of the inner bellows and a lower end connected to the lower end of the outer bellows, and means including a sleeve intermediate adjacent bellows having one end free and another end fastened to one of the bellows to guide the bellows and to limit relative movement between them.

6. A sealing arrangement comprising a casing having an opening, a movable stem projecting through the opening, an outer, an intermediate and an inner bellows concentrically surrounding the stem, the outer bellows being sealed to the casing, the inner bellows being sealed to the stem and the intermediate bellows having an upper end sealed to the upper end of the inner bellows and a lower end sealed to the lower end of the outer bellows, and means comprising a stop secured to the stem to limit expansion of the inner bellows and sleeves intermediate the bellows having lower ends secured to the intermediate and outer bellows and in cooperative relation with said stop to guide the bellows and to limit relative movement between them and means guiding the upper end of at least one of said sleeves and limiting upward movement thereof.

7. An article of manufacture comprising a plurality of concentric bellows connected in series with one end of each bellows directly secured to the adjacent end of another bellows, and sleeves intermediate adjacent bellows, with one end of each sleeve secured to one of the bellows and means associated with the other end of such sleeve to limit movement of the bellows.

8. An article of manufacture comprising an inner, an outer and an intermediate bellows, the upper ends of the inner and intermediate bellows being directly secured together and the lower ends of the intermediate and outer bellows being directly secured together, and guide and stop means including a sleeve between each pair of adjacent bellows concentrically arranged therewith with one end free and the other end secured to one of the bellows.

ELIS R. SANDOS.
SIDNEY O. HUNTINGTON.